US008996915B2

(12) United States Patent
Clifford et al.

(10) Patent No.: US 8,996,915 B2
(45) Date of Patent: Mar. 31, 2015

(54) TEST DATA GENERATION AND SCALE UP FOR DATABASE TESTING

(75) Inventors: Austin Clifford, Dublin (IE); Enda McCallig, Dublin (IE); Gary F. Murtagh, Dublin (IE)

(73) Assignee: International Business Machines Corporation, Armonk, NY (US)

( * ) Notice: Subject to any disclaimer, the term of this patent is extended or adjusted under 35 U.S.C. 154(b) by 286 days.

(21) Appl. No.: 13/538,269

(22) Filed: Jun. 29, 2012

(65) Prior Publication Data

US 2014/0006866 A1   Jan. 2, 2014

(51) Int. Cl.
*G06F 11/00* (2006.01)
*G06F 11/36* (2006.01)

(52) U.S. Cl.
CPC ............................ *G06F 11/3684* (2013.01)
USPC ............................... 714/25; 714/32; 714/47.1

(58) Field of Classification Search
CPC ... G06F 11/26; G06F 11/263; G06F 11/2635; G06F 11/36; G06F 11/3664; G06F 11/3672; G06F 11/3676; G06F 11/3684
USPC .............. 714/25, 27, 32, 33, 37, 40, 41, 47.1; 707/802, 804
See application file for complete search history.

(56) References Cited

U.S. PATENT DOCUMENTS

| | | | |
|---|---|---|---|
| 7,739,249 B2 | 6/2010 | Haham et al. | |
| 2005/0004918 A1 | 1/2005 | Platt | |
| 2006/0123009 A1* | 6/2006 | Bruno et al. | 707/10 |
| 2006/0230083 A1 | 10/2006 | Allyn et al. | |
| 2009/0182756 A1 | 7/2009 | Kang et al. | |
| 2010/0257513 A1 | 10/2010 | Thirumalai et al. | |
| 2010/0306591 A1* | 12/2010 | Krishna | 714/35 |
| 2011/0131002 A1* | 6/2011 | Sheye | 702/123 |
| 2013/0139003 A1* | 5/2013 | Patwardhan et al. | 714/32 |
| 2013/0159353 A1* | 6/2013 | Fuh et al. | 707/803 |

OTHER PUBLICATIONS

"Database Test Data Generation," [online] IBM Corporation, IP.com Prior Art Database, May 19, 2003, <http://ip.com/IPCOM/000012635>, 2 pgs.
Chays, D., "Test Data Generation for Relational Database Applications," Doctoral Dissertation, Polytechnic University, Dept. of Computer Science, Brooklyn, NY, 200, 79 pgs.

* cited by examiner

*Primary Examiner* — Joseph D Manoskey
(74) *Attorney, Agent, or Firm* — Cuenot, Forsythe & Kim, LLC

(57) ABSTRACT

Test data generation and scale up for database testing using unique common factor sequencing can include selecting a column of a table for which test data is needed and generating test data for the column that replicates cardinality characteristics of an existing production dataset and that includes a local predicate of a workload.

20 Claims, 4 Drawing Sheets

TEST DATA GENERATION AND SCALE UP FOR DATABASE TESTING

BACKGROUND

Modern software systems often rely upon large databases. When an issue arises within a customer installation of such a software system, the software developer attempts to replicate the issue within a test environment as a first step in fixing the issue. To do so, the software developer must have a representative dataset for the production database used by the customer. In many cases, the actual production database is so large that copying the database to the test environment is not feasible. Further, many production databases are used within industries in which strict legal requirements prevent the sharing of data.

In consequence, the software developer must generate a synthetic dataset that is representative of the dataset of the production database in which the issue occurred. The dataset must be generated from a limited set of known database artifacts relating to the production database.

BRIEF SUMMARY

One or more embodiments disclosed within this specification relate to test data generation and scale-up for database testing.

An embodiment can include a method. The method can include selecting a column of a table for which test data is needed and generating test data for the column that replicates cardinality characteristics of an existing production dataset and that includes a local predicate of a workload.

Another embodiment can include a system having a processor. The processor can be configured to initiate executable operations including selecting a column of a table for which test data is needed and generating test data for the column that replicates cardinality characteristics of an existing production dataset and that includes a local predicate of a workload.

Another embodiment can include a computer program product. The computer program product can include a computer readable storage medium having stored thereon program code that, when executed, configures a processor to perform operations. The operations can include selecting a column of a table for which test data is needed and generating test data for the column that replicates cardinality characteristics of an existing production dataset and that includes a local predicate of a workload.

DETAILED DESCRIPTION

Figure 1:
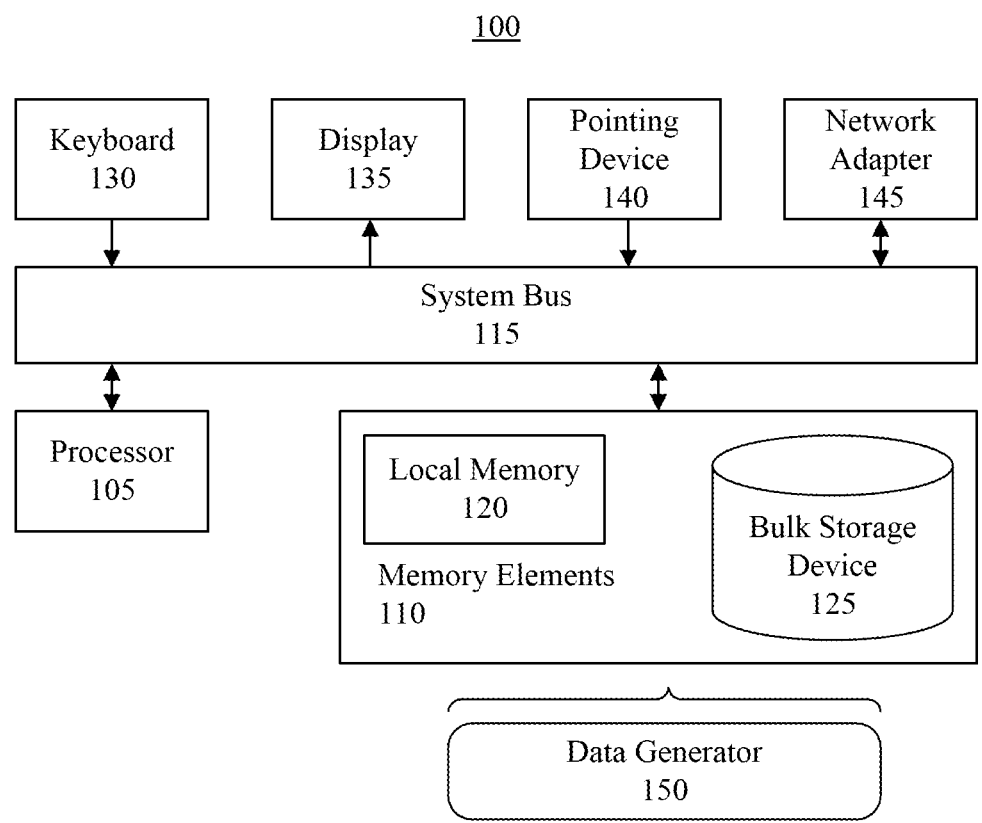
FIG. 1 is a block diagram illustrating an exemplary implementation of a system for test data generation and/or scale-up in accordance with an embodiment disclosed within this specification.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied, e.g., stored, thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk drive (HDD), a solid state drive (SSD), a random access memory (RAM), a read-only memory (ROM), an erasable programmable read-only memory (EPROM or Flash memory), an optical fiber, a portable compact disc read-only memory (CD-ROM), a digital versatile disc (DVD), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the invention. It will be understood that each block of the flowchart illustrations and/ or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

One or more embodiments disclosed within this specification relate to test data generation and scale-up for database testing. In accordance with the inventive arrangements disclosed within this specification, unique common factor sequencing can be used in generating test data and in scaling-up the test data. Test data, e.g., a test dataset, can be generated that replicates various cardinality characteristics of an existing dataset for a production database. The test data also includes any required local predicates which satisfy an existing workload obtained for the production database.

FIG. 1 is a block diagram illustrating an exemplary implementation of a system 100 for test data generation and/or scale-up in accordance with an embodiment disclosed within this specification. System 100 can include at least one processor 105 coupled to memory elements 110 through a system bus 115 or other suitable circuitry. As such, system 100 can store program code within memory elements 110. Processor 105 can execute the program code accessed from memory elements 110 via system bus 115.

In one aspect, system 100 can be implemented as a computer that is suitable for storing and/or executing program code. It should be appreciated, however, that system 100 can be implemented in the form of any system including a processor and memory that is capable of performing the functions and/or operations described within this specification.

Memory elements 110 can include one or more physical memory devices such as, for example, local memory 120 and one or more bulk storage devices 125. Local memory 120 refers to RAM or other non-persistent memory device(s) generally used during actual execution of the program code. Bulk storage device(s) 125 can be implemented as a hard disk drive (HDD), solid state drive (SSD), or other persistent data storage device. System 100 also can include one or more cache memories (not shown) that provide temporary storage of at least some program code in order to reduce the number of times program code must be retrieved from bulk storage device 125 during execution.

Input/output (I/O) devices such as a keyboard 130, a display 135, and a pointing device 140 optionally can be coupled to system 100. The I/O devices can be coupled to system 100 either directly or through intervening I/O controllers. One or more network adapters 145 also can be coupled to system 100 to enable system 100 to become coupled to other systems, computer systems, remote printers, and/or remote storage devices through intervening private or public networks. Modems, cable modems, and Ethernet cards are examples of different types of network adapters 145 that can be used with system 100.

As pictured in FIG. 1, memory elements 110 can store a data generator 150. Data generator 150, being implemented in the form of executable program code, can be executed by system 100 and, as such, can be considered part of system 100. Accordingly, in executing data generator 150, system 100 is configured to perform and/or initiate the various functions and/or operations described within this specification.

In order to generate test data, e.g., a test dataset, that is representative of a dataset for a production database, system 100 generally has access to one or more artifacts. For example, system 100 can access or utilize one or more of a schema definition from the production database, cardinality statistics of the production database, and a sample workload from a time or time span of interest for the production database.

A schema formally defines the structure of a database and defines the various objects within the database. Typically, the schema is specified in a formal language such as a Data Definition Language or a Data Description Language (DDL). For example, a schema includes a set of rules called integrity constraints that are imposed on the database. The integrity constraints ensure compatibility between parts of the schema.

Cardinality statistics specify a variety of different types of information. For example, table cardinality is the number of rows in the table. The cardinality of one table, e.g., a first table, in relation to another table, e.g., a second table, of a database further can indicate the relationship of the first table to the second table. Examples of these relationships can include many-to-many, many-to-one, one-to-many, and one-to-one. Column cardinality is the number of distinct values in a column of a table. As such, cardinality statistics can indicate these various quantities relating to a table and the relationship(s) among tables.

A workload is the amount of work a machine, or machines, produce in a specified time period. In the case of a database, a workload can be specified in terms of the operations executed at a particular time or within a particular time span. Thus, a workload (whether a snapshot of a workload or a sample workload) can be specified in terms of data manipulation language (DML) statements executing at the time, or within the time span, of interest. A DML statement is a statement used to manage data within one or more schema objects. An example of a DML statement that can be found within a workload is a Structure Query Language (SQL) statement such as a "SELECT" statement as is used to retrieve data from a database.

System 100 can assign a different cardinality of sequence to a set of columns for a table of test data for purposes of generating a sequence of data that repeats according to a respective cardinality. A cardinality sequence is the number of values in a sequence that occurs before the sequence repeats. System 100 can be configured to select the cardinality of sequence for each column so as not to include a common factor other than unity amongst the columns. System 100 can generate data for the columns according to the cardinality of sequence for each column.

In other cases, system 100 can generate data randomly without regard to any particular cardinality of sequence. System 100 can scale-up a resultant fact table by continuing the sequence for the set of columns. System 100 can scale-up the fact table further through duplication of data in other columns. In this manner, the fact table can be created quickly without risking duplicate keys or joins. In performing the functions described, system 100 further can ensure that the resulting test data, whether during data generation and/or scale-up, includes any required local predicates which satisfy an existing workload obtained for the production database.

Figure 2:
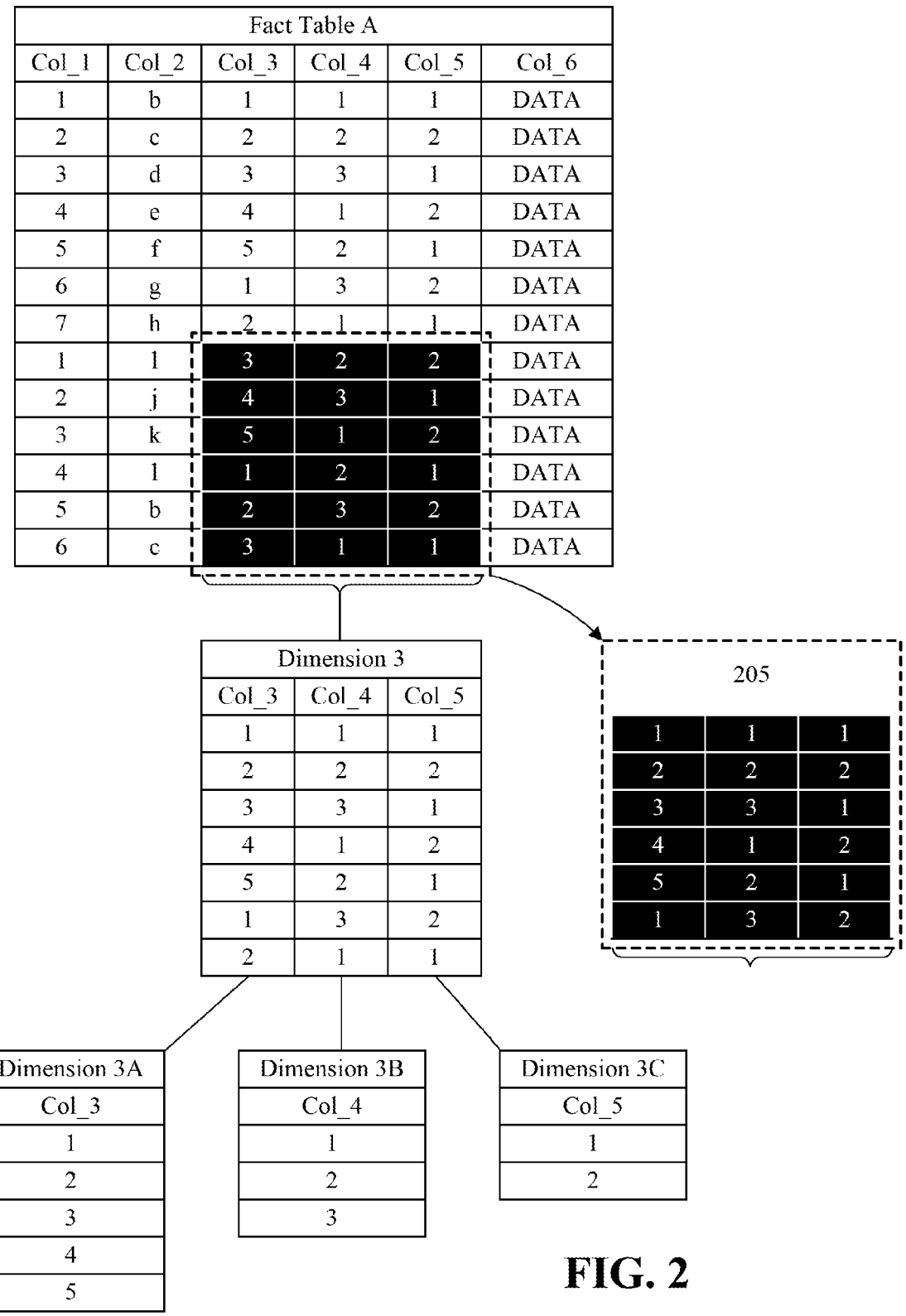
FIG. 2 illustrates an aspect of data generation for tables of a database structure in accordance with another embodiment disclosed within this specification.

FIG. 2 illustrates an aspect of data generation for tables of a database structure in accordance with another embodiment disclosed within this specification. FIG. 2 illustrates a Fact Table A being joined to a dimension table called Dimension 3. Dimension 3 is joined to sub-dimension tables Dimension 3A, Dimension 3B, and Dimension 3C. While not illustrated, Dimension 3 also can be joined to another fact table, e.g., Fact Table B. For instance, Dimension 3 can be joined to another fact table through a subset of the full complement of key columns for Dimension 3. Thus, whereas Fact Table A is joined with Dimension 3 via columns 3, 4, and 5, a different fact table can be joined to Dimension 3 through a subset of columns 3, 4, and 5, e.g., columns 3 and 4, columns 4 and 5, or columns 3 and 5.

As its name suggests, Fact Table A is a fact table. Dimension 3 is a dimension table joined to Dimensions 3A, 3B, and 3C, which are sub-dimension tables. As appreciated by one skilled in the art, a fact table includes business facts or measures. A fact table also can include foreign keys that refer to candidate keys, e.g., primary keys, in a dimension table. A dimension table is a companion table to a fact table.

In the example pictured in FIG. 2, the table cardinality of Dimension 3 is 7. The table cardinality of Dimension 3 is less than the full Cartesian product of Dimension 3A, Dimension 3B, and Dimension 3C. Since Fact Table A contains more rows than Dimension 3, when generating data, a system may cycle through more combinations of columns 3, 4, and 5. This will generate orphan rows corresponding to the last, or bottom, six rows of Fact Table A. As shown, the values within each of the shaded cells of each row, which represent a composite key, do not correspond to any rows in Dimension 3. Thus, the composite key of the last six rows of Fact Table A does not match Dimension 3, rendering the last six rows orphans. A primary key of a relational table uniquely identifies each record in the table. A composite key refers to a key that is formed from multiple columns. For example, the composite key of row 1 of Dimension 3 is formed of columns 3, 4, and 5 and is "1, 1, 1".

In accordance with the embodiments disclosed within this specification, a system such as system 100 of FIG. 1 generates the values illustrated in box 205 in place of the shaded cells within Fact Table A, thereby not generating orphan rows. System 100 can generate values as illustrated in the case where a dimension table is partially filled, e.g., does not include a full Cartesian product of the key columns, thereby avoiding the creation of orphan rows.

In generating data, a system can utilize a methodology in which cycling sequences of prime numbers are used. Each key column must have a unique column cardinality. More particularly, each key column must have a unique column cardinality that does not share a common factor, other than unity or one, with the column cardinality of any other key column of the same table. One way of ensuring this condition is to utilize a different prime number for the column cardinality of each key column. For example, the system can assign different cardinality sequence values to the column in the set, wherein the cardinality sequence values do not share a common factor except for unity. The cardinality sequence values can be different prime numbers.

Figure 3:
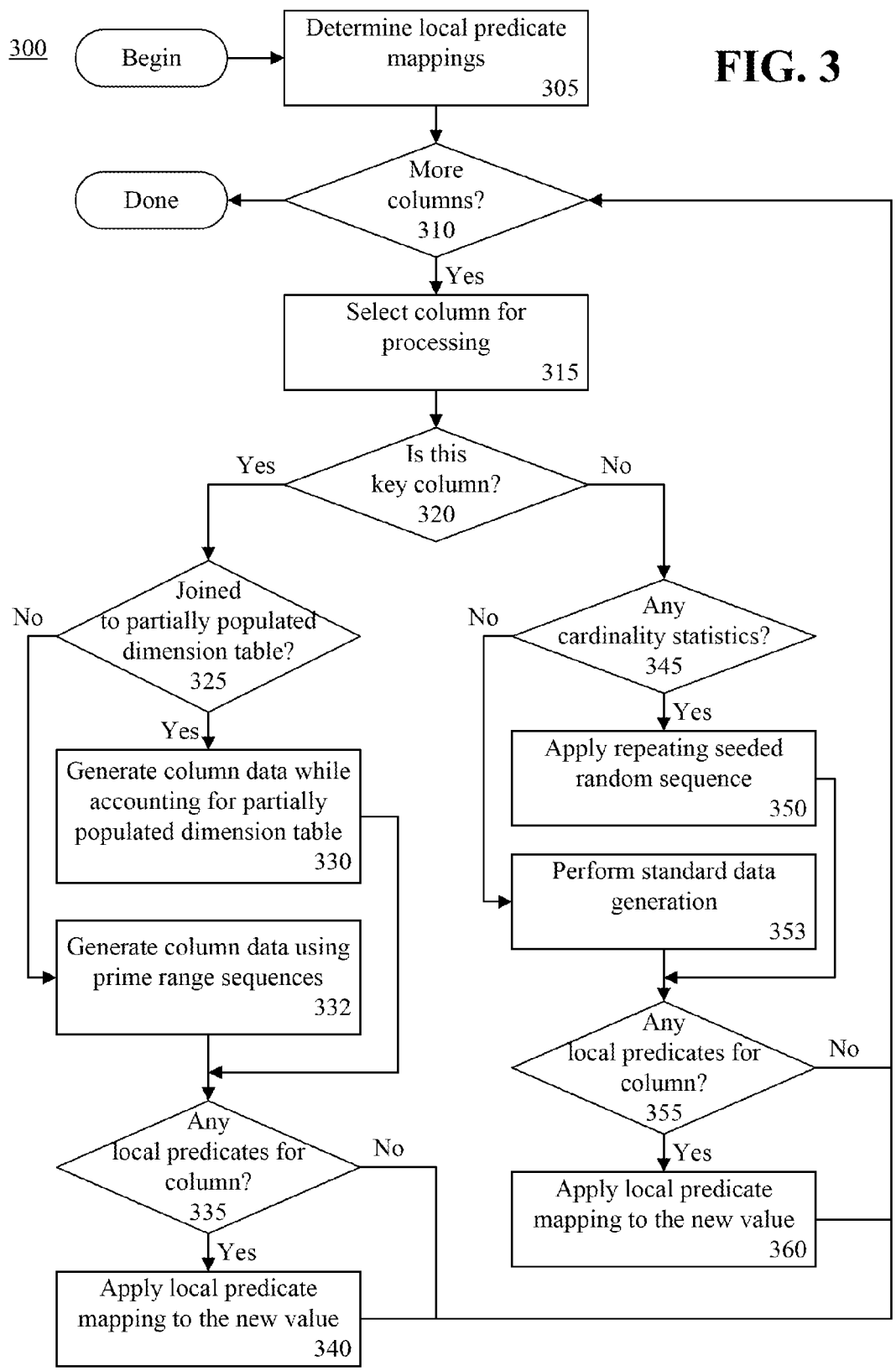
FIG. 3 is a flow chart illustrating a method of generating data in accordance with another embodiment disclosed within this specification.

FIG. 3 is a flow chart illustrating a method 300 of generating data in accordance with another embodiment disclosed within this specification. Like numbers will be used to refer to the same items throughout this specification. Method 300 can be performed using a system such as system 100 described with reference to FIG. 1 to generate test data that is representative of a dataset of a production database. In doing so, the system can be provided access to various artifacts including, but not limited to, a schema, cardinality statistics, and/or a workload (or snapshot or example thereof) for the production database.

In block 305, the system can determine local predicate mappings for the table. In one aspect, the system can determine the local predicate mappings from a workload from the production system. The system can, for example, determine local predicates of the SELECT statements of the workload.

In one aspect, a utility function that is incorporated into the system can be used to determine local predicate mappings from the workload. One example of such a utility can include the EXPLAIN facility as is available within the DB2®, database system available from International Business Machines of Armonk, N.Y.

User applications typically request a set of rows from a database with a DML statement that specifies qualifiers for the specific rows to be returned as the result set. The qualifiers, which usually appear in the "where" clause of the query, are referred to as "predicates." A "local predicate" refers to a non-join predicate on a table that is being joined, typically involving a constant/literal value.

In block 310, the system can determine whether any further columns of the table remain to be processed. If so, method 300 can proceed to block 315. If not, method 300 can end. In block 315, the system can select a column of the table that has not yet been processed. In block 320, the system can determine whether the selected column is a key column. If so, method 300 can proceed to block 325. If not, method 300 can continue to block 345.

Beginning in block 325, the system performs processing of key columns. Accordingly, in block 325, the system determines whether the selected column is joined to a partially populated dimension table. If so, method 300 continues to block 330. If not, method 300 proceeds to block 332.

In block 330, the system generates column data. The system is configured to generate column data in a manner that accommodates for a partially populated dimension table. In one aspect, the system can generate data for cells of the column being processed according to expression 1 below.

$$\text{MOD}(\text{MOD}(N,C)-1,R)+1 \tag{1}$$

Within expression 1, N is the row number being processed, R is the prime (e.g., prime number) column cardinality, or range, for the column being processed, and C is the table cardinality of the dimension table, i.e., the row count. The term "MOD" refers to the modulus function as expressed in the form MOD(x, y)=x % y.

In the case where the table being processed uses a subset of the key of the dimension table, column data can be generated using expression 2 below in lieu of expression 1.

$$\text{MOD}(\text{MOD}(\text{MOD}(N,C),S)-1,R)+1 \tag{2}$$

Within expression 2, N, C, and R can be the same as described with reference to expression 1. S is the Subset Cardinality. Subset Cardinality refers to the product of the ranges of the columns in the key subset. Such is the case as the subset may be capable of generating a number of unique values less than the dimension count. For example, the value of column 3 on row 10 of Fact Table A of FIG. 2 is calculated as follows: (((10%7)−1) %5)+1=3. In accordance with the inventive arrangements disclosed within this specification, there is no need to maintain counters for each sequential key column during data generation and data generation can be partitioned into multiple distinct parallel streams and scaled-up.

In block 332, in the case where the column is a key column and is not joined to a partially populated dimension table, the system can generate column data using prime range sequences. In one embodiment, the system can use expression 2.5 below.

$$MOD(N-1,R)+1 \qquad (2.5)$$

Within expression 2.5, N and R can be the same as described with reference to expression 1 and 2.

Continuing, in block 335, the system determines whether there are any local predicates for the selected column, which is a key column. If not, method 300 loops back to block 310 to continue processing any further columns. If so, method 300 continues to block 340.

For example, the artifacts from the workload can include DML/SELECT statements which include local predicates with literal values that are outside of the sequential ranges. In that case, were DML statements run against the generated data, no rows would be returned, which is not a realistic representation of the production database.

The local predicates can be identified and extracted by running the DML statement through EXPLAIN PLAN/db2expln command and filtering the output of the PREDICATE_TEXT column of the EXPLAIN_PREDICATE table.

Consider Fact Table B shown below in which a SELECT statement includes a local predicate on column 3. For example, the local predicate can be "WHERE FACT TABLE B.col1=99".

| Fact Table B | | | |
|---|---|---|---|
| Column 3 | Column 4 | Column 7 | Column 8 |
| 1 | 1 | 1 | DATA1 |
| 2 | 2 | 2 | DATA2 |
| 3 | 3 | 3 | DATA3 |
| 4 | 1 | 4 | DATA4 |
| 5 | 2 | 5 | DATA5 |
| 1 | 3 | 6 | DATA6 |
| 2 | 1 | 7 | DATA7 |
| 3 | 2 | 8 | DATA8 |
| 4 | 3 | 9 | DATA9 |
| 5 | 1 | 10 | DATA10 |
| 1 | 2 | 11 | DATA11 |
| 2 | 3 | 1 | DATA12 |

If, however, column 3 is actually sparsely populated and the column cardinality is, for example, 5, then the value of 99 will not be generated. Accordingly, a range of values must be reserved at the start of the prime range for these local/literal predicates.

Referring to the local predicate "WHERE FACT TABLE B.col1=99", the first value populated in column 3 is 99. If the column cardinality is greater than the literal value in the local predicate, then there is no need to reserve this number. In fact, reserving the number will introduce a duplicate value. The distinct number of values in the range must be a prime number. This presumes that sequential numbering is used so that the local/literal predicate value used as a replacement exceeds the largest sequential number used. In this regard, the value of 99 is being substituted for the value of 1.

The system can perform similar processing for range predicates, e.g., "IN" or "BETWEEN" predicates. For example, consider the predicate "WHERE FACT_TABLE_B.col3 IN (99, 250)". In this example, the entire set of values is reserved, i.e., 99 and 250 at the start of the range.

In the case where there are local predicates on two different columns, the system reserves the local predicates in a way that the required combination exists in the generated dataset. For example, consider the following predicates:

WHERE FACT_TABLE_B.col3 in (99, 250)
AND FACT_TABLE_B.col4=665

The system uses 99 and 250 as the first 2 values in the sequence of values for column 3 and 665 as the first value in the sequence for column 4. In these examples, each of the literal values of the local predicates is larger than the range for the respective column and, as such, is not already present in the data for the column. The system reserves the replacement values for the local predicates in ascending order in the range as shown below for the updated version of Fact Table B denoted as Fact Table B'.

| Fact Table B' | | | |
|---|---|---|---|
| Column 3 | Column 4 | Column 7 | Column 8 |
| 99 | 665 | 1 | DATA1 |
| 250 | 2 | 2 | DATA2 |
| 3 | 3 | 3 | DATA3 |
| 4 | 665 | 4 | DATA4 |
| 5 | 2 | 5 | DATA5 |
| 99 | 3 | 6 | DATA6 |
| 250 | 665 | 7 | DATA7 |
| 3 | 2 | 8 | DATA8 |
| 4 | 3 | 9 | DATA9 |
| 5 | 665 | 10 | DATA10 |
| 99 | 2 | 11 | DATA11 |
| 250 | 3 | 1 | DATA12 |

Accordingly, in block 340, the system applies the local predicate mapping to the new value. In one aspect, the system can determine a value denoted as "X" using expression 3.

$$X=MOD(N-1,R)+1 \qquad (3)$$

Within expression 3, N is the row number, R is the prime column cardinality (range) for the column, and MOD refers to the modulus function previously described. The system can calculate the value "X" using expression 3. In one aspect, the system can use a lookup array to determine whether X needs to be mapped to a new value. In another aspect, the system can calculate the new value, e.g., mapping, using expression 4.

$$X+abs(abs(sign(1-X))-1)*(T1-1)+abs(abs(sign(2-X))-1)*(T2-2)+ \ldots +abs(abs(sign(N-X))-1)*(Tn-n) \qquad (4)$$

Within expression 4, T1 is the value to which "1" is mapped, T2 is the value to which "2" is mapped, etc., with Tn being the value to which the nth value in the sequence is mapped. The term "abs( )" represents the Absolute Value function which returns the absolute value of an integer. The "sign( )" term represents the sign function which returns "−1" for negative numbers, "0" for 0, and "1" for positive numbers.

Continuing with block 345, the system begins processing columns determined to be key columns. In block 345, the system can determine whether any cardinality statistics are available for the column. If not, method 300 can proceed to block 353. If so, method 300 can continue to block 350.

In block 350, the system can apply repeated seeded random sequence processing. In one aspect, repeated seeded random sequence processing can be performed according to expression 5 below.

$$\text{Random}(E).\text{Value}[\text{MOD}(N-1,R)+1] \quad (5)$$

Within expression 5, E is the seed for the column, N is the row number being processed, R is the column cardinality, and MOD is the modulus function previously described. In the notation for expression 5, "Random(E).Value[X]" signifies the "Xth" element in the random sequence generated using seed E. Within expression 5, R need not be a prime number.

For example, consider block 350 in relation to Fact Table C shown below. In order to enforce column cardinality on the non-key columns, random seeding can be used. If column 12 of Fact Table C is to have column cardinality of six, six distinct "random" values for column 12 can be generated and repeated after row six as shown. By using seeding, the system ensures that the same sequence of random numbers is achieved again.

| Fact Table C | | |
|---|---|---|
| Column 10 | Column 11 | Column 12 |
| 1 | 1 | 52675 |
| 2 | 2 | 7654 |
| 3 | 3 | 9826 |
| 4 | 1 | 1182 |
| 5 | 2 | 87644 |
| 1 | 3 | 5081 |
| 2 | 1 | 52675 |
| 3 | 2 | 7654 |
| 4 | 3 | 9826 |
| 5 | 1 | 1182 |
| 1 | 2 | 87644 |
| 2 | 3 | 5081 |

In block 353, in the case where the column is not a key column and does not include cardinality statistics, standard data generation can be performed. In one aspect, standard data generation can be performed using expression 5 below.

$$\text{Random}(E).\text{Value}[N] \quad (5.5)$$

Within expression 5.5, E is the seed for the column and N is the row number being processed. In the event that no seed is specified, the seed is a random seed.

In block 355, the system can determine whether any local predicates have been determined for the selected column, which is a non-key column. If not, method 300 loops back to block 310 to continue processing. If so, method 300 continues to block 360.

In block 360, the system applies local predicate mapping to the new value. In order to include any local predicates in the selected (non-key) column, the first values in the sequence can be replaced with the local predicates. The system can determine values for the column using expression 6 shown below.

$$\text{Random}(E).\text{Value}[X]+(\text{abs}(\text{sign}(1-X))-1)*(T1-1)+ \\ \text{abs}(\text{abs}(\text{sign}(2-X))-1)*(T2-2)+\ldots+\text{abs}(\text{abs} \\ (\text{sign}(n-X))-1)*(Tn-n) \quad (6)$$

Within expression 6, T1 is the value to which the first value in the sequence is mapped, T2 is the value to which the second value in the sequence is mapped, etc., with Tn being the value to which the "nth" value in the sequence is mapped. As discussed, "Random(E).Value[X]" signifies the "Xth" element in the random sequence generated using seed E. The term "X" is "N" where there are no cardinality statistics for the selected column. As noted, the term "N" is the row number. The term "X" is "MOD(N−1, R)+1" where R is the column cardinality.

In illustration, consider the case in which column 12 of Fact Table C' has a cardinality of 6 and needs to include local predicate 909. In that case, expression 6 can be rewritten as: Random(E).Value[MOD(N−1, 6)+1]+abs(abs(sign(1−(MOD(N−1, 6)+1)))−1)*(909−1). Solving the expression above, results in Fact Table C shown below with respect to column 12.

| Fact Table C' | | |
|---|---|---|
| Column 10 | Column 11 | Column 12 |
| 1 | 1 | 909 |
| 2 | 2 | 7654 |
| 3 | 3 | 9826 |
| 4 | 1 | 1182 |
| 5 | 2 | 87644 |
| 1 | 3 | 5081 |
| 2 | 1 | 909 |
| 3 | 2 | 7654 |
| 4 | 3 | 9826 |
| 5 | 1 | 1182 |
| 1 | 2 | 87644 |
| 2 | 3 | 5081 |

Figure 4:
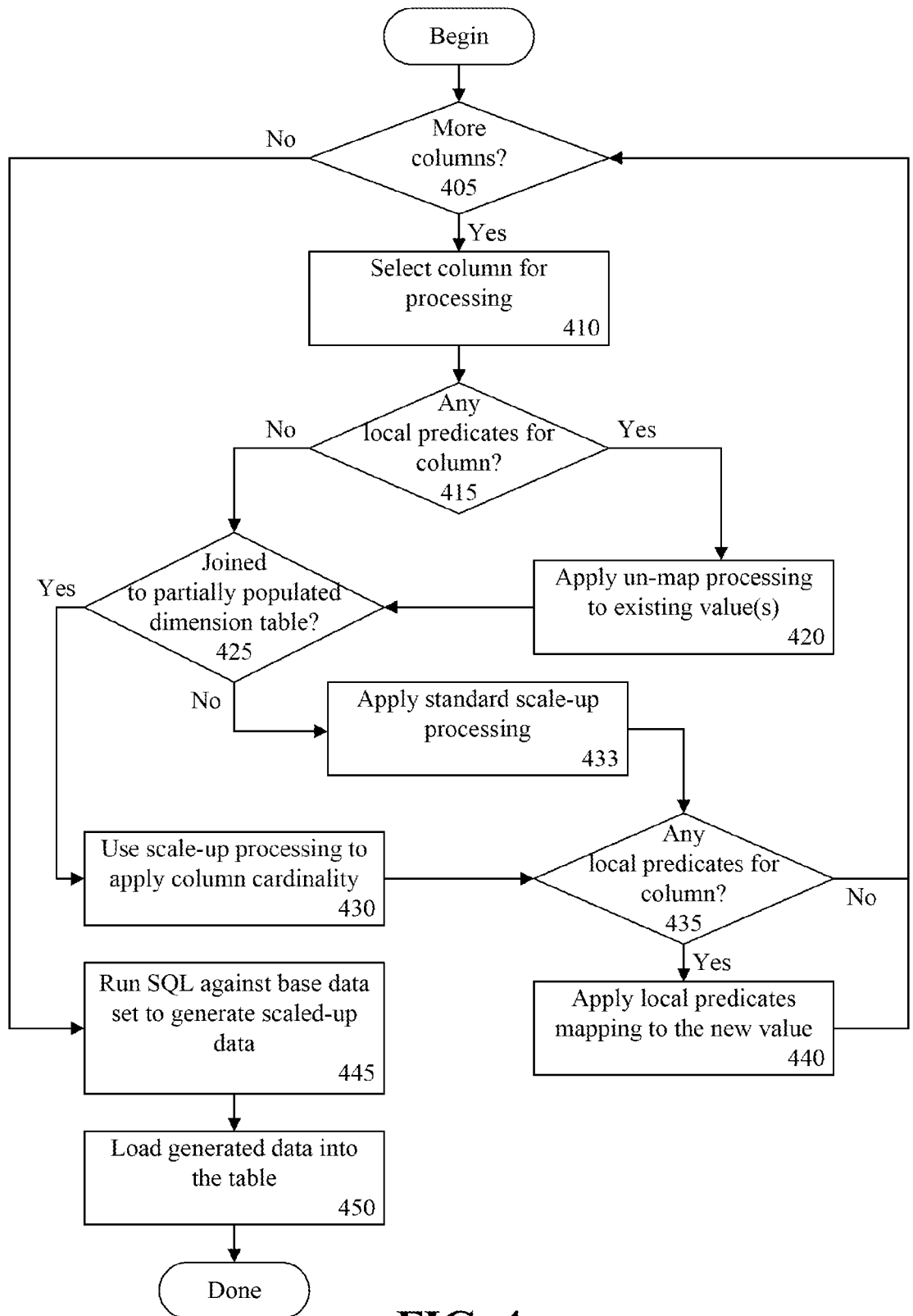
FIG. 4 is a flow chart illustrating a method of scaling-up data in accordance with another embodiment disclosed within this specification.

FIG. 4 is a flow chart illustrating a method 400 of scaling-up data in accordance with another embodiment disclosed within this specification. Method 400 can be performed using a system as described with reference to FIG. 1. Scaling-up data refers to a process in which data that is already within a table is used to generate new data within the table that is a continuation of the existing data. In doing so, key column values can be transposed to generate the new data.

Accordingly, method 400 can begin in a state where a table is selected for which scaling-up data included therein is to be performed. Method 400 can begin in block 405 where the system determines whether any further columns of the table are to be processed. If so, method 400 can proceed to block 410. If not, method 400 can continue to block 445.

In block 410, the system can select a column of the table for processing. In block 415, the system can determine whether there are any local predicates for the selected column. If so, method 400 can proceed to block 420. If not, method 400 can continue to block 425. The processing described below is used to generate SQL statements and/or instructions that are usable in the processing described in block 445. For example, blocks 420, 430, and 440 and the expressions described with reference to such blocks are directed to, and utilized for, building SQL statements that, when executed, generate values as described. The SQL statements that are built are used with a data unload tool, described below, in implementing block 445. Accordingly, in block 420, the system applies un-map processing to existing value(s) of the selected column.

In block 425, the system can determine whether the selected column is joined to a partially populated dimension table. If so, method 400 continues to block 430. If not, method 400 proceeds to block 433.

In block 430, the system can use scale-up processing to apply column cardinality. In one aspect, a data unload tool can be utilized. A data unload tool is configured to read directly from containers without utilizing the database engine of the database system. The data unload tool can read directly if the select statement(s) that are used involve only basic arithmetic operations. The various processes and expressions discussed below are usable in that context.

New values for the column can be calculated using expression 7 below.

$$X+(\text{abs}(\text{sign}(1-X))-1)*(T1-1)+\text{abs}(\text{abs}(\text{sign}(2-X))-1)\\*(T2-2)+\ldots+\text{abs}(\text{abs}(\text{sign}(n-X))-1)*(Tn-n) \quad (7)$$

Within expression 7, T1 is the value to which "T1" is mapped, T2 is the value to which "T2" is mapped, etc., with Tn being the value to which the "nth" value in the sequence is mapped. For purposes of performing scale-up as exemplified in FIG. 4, "n" values T1 through Tn must be in ascending order, where n is an integer value. Further, the term "X" is determined according to expression 8 below.

$$X=\text{mod}((L+(\text{mod}(\ldots\text{mod}(V-1,Tn-n),\ldots T2-2),T1-1)),R)+1 \quad (8)$$

Within expression 8, X is the scaled-up, unmapped value. R is the column cardinality. The term L is the last value in the table for this column. V is the value of the column in the row being transposed (e.g., processed) to generate a new "scale-up" row to load into the table.

In the event that the cardinality statistics, i.e. partially populated dimension tables, expression was used to generate the base dataset, then X is determined according to expression 9 below.

$$X=\text{MOD}((\text{MOD}(\text{MOD}(L+(\text{mod}(\ldots\text{mod}(V-1,Tn-n),\\\ldots T2-2),T1-1),C),S)-1),R)+1 \quad (9)$$

Within expression 9, the term C is the table cardinality of the associated dimension table and S is the product of the ranges of the columns in the key subset. The term L is the last value in the table for this column (based on no mappings). V is the value of the column in the row being transposed to generate a new "scale-up" row to load into the table. R is the column cardinality (range). Expression 9 is calculated using the original data generation formula and the current row count of the table.

In the case where the cardinality statistics, i.e. the partially populated dimension tables, formula was used to generate the base dataset, then this should be used again to calculate the last value. Accordingly, referring to Fact Table B', column 3 is calculated as follows:

col3
1→99
2→250
3→3
4→4
5→5

In which:

col3 NEW VALUE=mod((L+mod(mod(V-1,248),98)),5)+1+abs(abs(sign(1-(mod((L+mod(mod(V-1,248),98)),5)+1)))-1)*98+abs(abs(sign(2-(mod((L+mod(mod(V-1,248),98)),5)+1)))-1)*248

To apply this formula for calculating the value for row 13 of the table:

col3=mod((2+mod(mod(99-1,248),98)),5)+1+abs(abs(sign(1-(mod((2+mod(mod(99-1,248),98)),5)+1)))-1)*98+abs(abs(sign(2-(mod((2+mod(mod(99-1,248),98)),5)+1)))-1)*248 col3=2+1+0*98+0*248=3

With regard to column 4 of Fact Table B':
col4
1→665
2→2
3→3 col4 NEW VALUE=mod((L+mod(V-1,664)),3)+1+abs(abs(sign(1-(mod((L+mod(V-1,664)),3)+1)))-1)*664

To apply this formula for calculating the value for row 13 of the table:

col4=mod((3+mod(665-1,664)),3)+1+abs(abs(sign(1-(mod((3+mod(665-1,664)),3)+1)))-1)*664 col4=0+1+1*664=665

Continuing with block 433, the system can apply standard scale-up processing. In one embodiment, new values for the column can be calculated using expression 10 below.

$$\text{MOD}((L+V-1),R)+1 \quad (10)$$

Within expression 10, L is the last value in the table for the column being processed, V is the existing value in the row for the column being processed, and R is the prime column cardinality for the column.

In block 435, the system can determine whether there are any local predicates for the selected column. If so, method 400 continues to block 440. If not, method 400 proceeds to block 405. In block 440, the system can apply local predicates mapping to the new value(s) of the selected column. After block 440, method 400 can loop back to block 405 to continue processing. In block 445, the system can run SQL against the base dataset to generate the scaled-up data. As noted, the various SQL statements that are built in blocks 420, 430, and 440, for example, are run or executed against the base dataset to generate the scaled-up data. The SQL statements can be run using the data unload tool as described. In block 450, the system can load the data into the table.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Reference throughout this specification to "one embodiment," "an embodiment," or similar language means that a particular feature, structure, or characteristic described in connection with the embodiment is included in at least one embodiment disclosed within this specification. Thus, appearances of the phrases "in one embodiment," "in an embodiment," and similar language throughout this specification may, but do not necessarily, all refer to the same embodiment.

The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another unless stated otherwise or the context indicates otherwise.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The corresponding structures, materials, acts, and equivalents of all means or step plus function elements in the claims below are intended to include any structure, material, or act for performing the function in combination with other claimed elements as specifically claimed. The description of the embodiments disclosed within this specification have been presented for purposes of illustration and description, but are not intended to be exhaustive or limited to the form disclosed. Many modifications and variations will be apparent to those of ordinary skill in the art without departing from the scope and spirit of the embodiments of the invention. The embodiments were chosen and described in order to best explain the principles of the invention and the practical application, and to enable others of ordinary skill in the art to understand the inventive arrangements for various embodiments with various modifications as are suited to the particular use contemplated.

What is claimed is:

1. A method, comprising:
   selecting a column of a table for which test data is needed; and
   generating test data for the column that replicates cardinality characteristics of an existing production dataset and that comprises a local predicate of a workload.

2. The method of claim 1, wherein the column is a key column and is joined to a partially populated dimension table, wherein generating test data for the column comprises:
   calculating values using $MOD(MOD(N, C)-1, R)+1$, in which N is a row number of the column being processed, R is prime column cardinality of the column, and C is table cardinality of the dimension table.

3. The method of claim 1, wherein the column is a key column and is joined to a partially populated dimension table, wherein generating test data for the column comprises:
   calculating values using $MOD(MOD(MOD(N, C), S)-1, R)+1$, in which N is a row number of the column being processed, R is prime column cardinality of the column, C is table cardinality of the dimension table, and S is subset cardinality.

4. The method of claim 1, wherein the column is a key column, the method further comprising:
   determining that a local/literal predicate for a row of the column has a value that exceeds a largest sequential value generated for the column; and
   applying a local predicate mapping process in which a value for the row of the column is replaced by the value of the local/literal predicate.

5. The method of claim 4, wherein applying a local predicate mapping process comprises:
   calculating a value for the column using $X=MOD(N-1, R)+1$, in which X is an initial value to be calculated, N is a row number of the column being processed, and R is prime column cardinality for the column; and
   mapping X to a value of a literal/local predicate for the row being processed.

6. The method of claim 4, wherein applying a local predicate mapping process comprises:
   calculating values for a column comprising a local predicate using $X=MOD(N-1, R)+1$, in which X is an initial value to be calculated, N is a row number of the column being processed, and R is prime column cardinality for the column; and
   calculating a sequence of values to which X is mapped using $X+abs\ (abs\ (sign\ (1-X))-1)*(T1-1)+abs(abs(sign(2-X))-1)*(T2-2)+\ldots+abs\ (abs\ (sign(N-X))-1)*(Tn-n)$, in which T1 is a value to which a first value in the sequence is mapped, T2 is a value to which a second value in the sequence is mapped, through Tn being a value to which the nth value in the sequence is mapped.

7. The method of claim 1, further comprising:
   responsive to determining that the column is not a key column and that cardinality statistics are available for the column, generating values using $Random(E).Value[MOD(N-1, R)+1]$, in which E is a seed for the column, N is a row number being processed, and R is column cardinality for the column.

8. The method of claim 1, further comprising:
   responsive to determining that the column is not a key column, generating a sequence of values using $Random(E).Value[X]+(abs(sign(1-X))-1)*(T1-1)+abs(abs(sign(2-X))-1)*(T2-2)+\ldots+abs(abs(sign(n-X))-1)*(Tn-n)$, in which T1 is a value to which a first value in the sequence is mapped, T2 is a value to which a second value in the sequence is mapped, through Tn being a value to which an nth value in the sequence is mapped, and wherein X is a row number being processed in a case where there are no cardinality statistics for the selected column and $X=MOD(N-1, R)+1$ in a case where cardinality for the column is available, in which case N is a row number being processed and R is prime column cardinality.

9. The method of claim 1, further comprising:
   scaling-up the column from the generated test data by calculating a sequence of values for the column using $X+(abs(sign(1-X))-1)*(T1-1)+abs(abs(sign(2-X))-1)*(T2-2)+\ldots+abs(abs(sign(n-X))-1)*(Tn-n)$, in which T1 is a value to which a first value in the sequence is mapped, T2 is a value to which a second value in the sequence is mapped, through Tn being a value to which an nth value in the sequence is mapped, wherein X is determined according to $X=mod((L+(mod(\ldots mod(V-1, Tn-n),\ldots T2-2), T1-1)), R)+1$, in which R is prime column cardinality, and L is a last value in the column.

10. The method of claim 1, further comprising:

scaling-up the column from the generated test data by calculating a sequence of values for the column using $X+(abs(sign(1-X))-1)*(T1-1)+abs(abs(sign(2-X))-1)*(T2-2)+ \ldots +abs(abs(sign(n-X))-1)*(Tn-n)$, in which T1 is a value to which a first value of the sequence is mapped, T2 is a value to which a second value in the sequence is mapped, through Tn being a value to which an nth value in the sequence is mapped, wherein X is determined according to $X=MOD((MOD(MOD(L+(mod(\ldots mod(V-1,Tn-n),\ldots T2-2),T1-1),C),S)-1),R)+1$, in which C is table cardinality of a partially populated dimension table joined to the column, S is subset cardinality, R is prime column cardinality of the column, and L is a last value in the column.

11. A system, comprising:

a processor configured to initiate executable operations comprising:

selecting a column of a table for which test data is needed; and generating test data for the column that replicates cardinality characteristics of an existing production dataset and that comprises a local predicate of a workload.

12. The system of claim 11, wherein the column is a key column and is joined to a partially populated dimension table, wherein generating data for the column comprises:

calculating values using $MOD(MOD(N, C)-1, R)+1$, in which N is a row number of the column being processed, R is prime column cardinality of the column, and C is table cardinality of the dimension table.

13. The system of claim 11, wherein the column is a key column and is joined to a partially populated dimension table, wherein generating data for the column comprises:

calculating values using $MOD(MOD(MOD(N, C), S)-1, R)+1$, in which N is a row number of the column being processed, R is prime column cardinality of the column, C is table cardinality of the dimension table, and S is subset cardinality.

14. The system of claim 11, wherein the column is a key column, wherein the processor is further configured to initiate executable operations comprising:

determining that a local/literal predicate for a row of the column has a value that exceeds a largest sequential value generated for the column; and applying a local predicate mapping process in which a value for the row of the column is replaced by the value of the local/literal predicate.

15. The system of claim 11, wherein the processor is further configured to initiate executable operations comprising:

responsive to determining that the column is not a key column and that cardinality statistics are available for the column, generating values using $Random(E).Value[MOD(N-1, R)+1]$, in which E is a seed for the column, N is a row number being processed, and R is column cardinality for the column.

16. A computer program product, comprising:

a computer readable storage medium having embodied therewith, program code that, when executed, configures a processor to perform executable operations comprising:

selecting a column of a table for which test data is needed; and generating test data for the column that replicates cardinality characteristics of an existing production dataset and that comprises a local predicate of a workload.

17. The computer program product of claim 16, wherein the column is a key column and is joined to a partially populated dimension table, wherein generating data for the column comprises:

calculating values using $MOD(MOD(N, C)-1, R)+1$, in which N is a row number of the column being processed, R is prime column cardinality of the column, and C is table cardinality of the dimension table.

18. The computer program product of claim 16, wherein the column is a key column and is joined to a partially populated dimension table, wherein generating data for the column comprises:

calculating values using $MOD(MOD(MOD(N, C), S)-1, R)+1$, in which N is a row number of the column being processed, R is prime column cardinality of the column, C is dimension cardinality of the dimension table, and S is subset cardinality.

19. The computer program product of claim 16, wherein the column is a key column, the computer readable storage medium having embodied therewith, further program code that, when executed, configures a processor to perform executable operations comprising:

determining that a local/literal predicate for a row of the column has a value that exceeds a largest sequential value generated for the column; and applying a local predicate mapping process in which a value for the row of the column is replaced by the value of the local/literal predicate.

20. The computer program product of claim 16, the computer readable storage medium having embodied therewith, further program code that, when executed, configures a processor to perform executable operations comprising:

responsive to determining that the column is not a key column and that cardinality statistics are available for the column, generating values using $Random(E).Value[MOD(N-1, R)+1]$, in which E is a seed for the column, N is a row number being processed, and R is column cardinality for the column.

* * * * *